June 24, 1930. R. M. GARRETT 1,766,019
APPARATUS FOR DETECTING LEAKY CANS
Filed June 7, 1928 8 Sheets-Sheet 3

INVENTOR
BY Richard M. Garrett
Mason, Fenwick + Lawrence
ATTORNEYS

June 24, 1930.  R. M. GARRETT  1,766,019
APPARATUS FOR DETECTING LEAKY CANS
Filed June 7, 1928  8 Sheets-Sheet 7

INVENTOR
Richard M. Garrett
Mason, Fenwick + Lawrence
ATTORNEYS

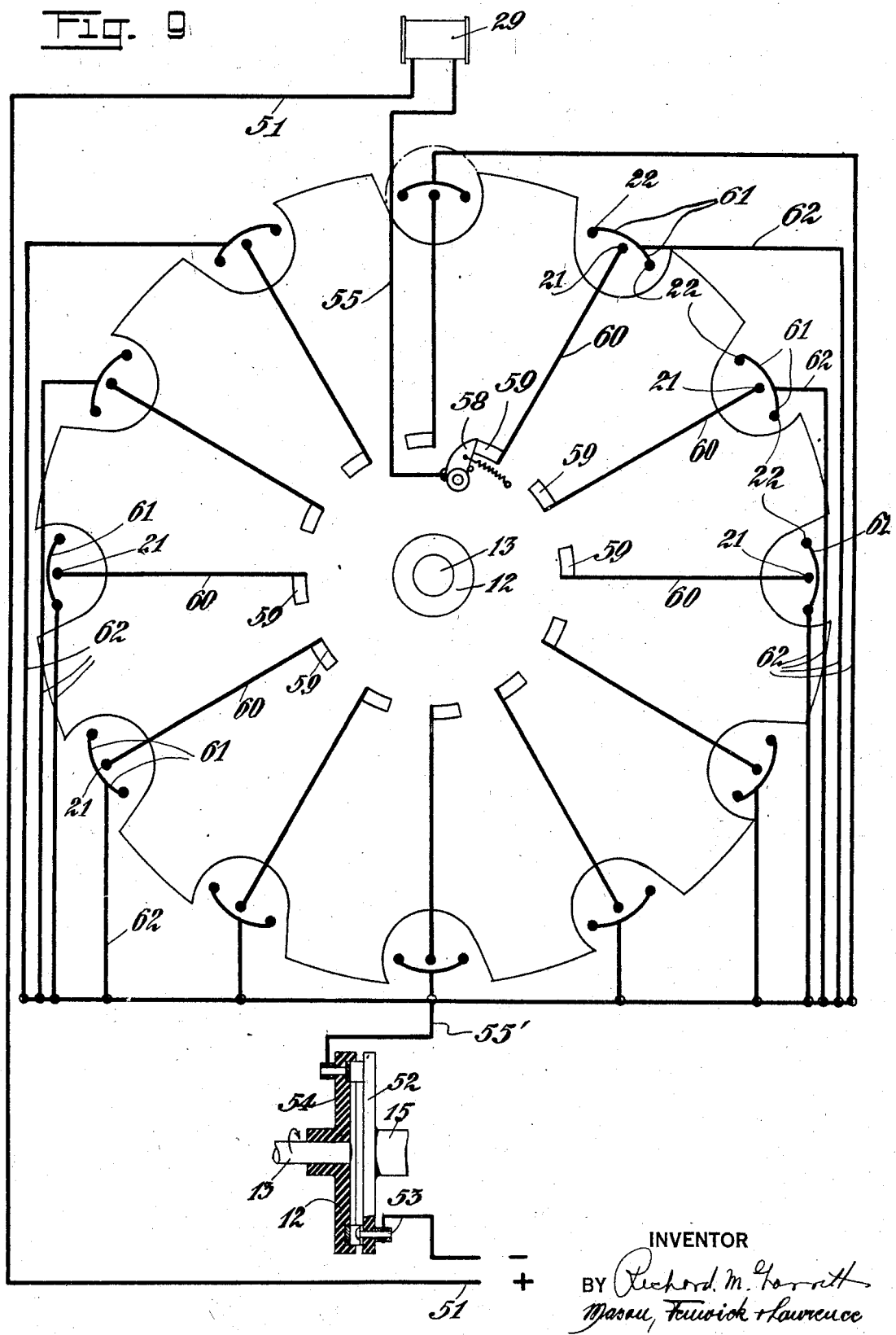

Patented June 24, 1930

1,766,019

UNITED STATES PATENT OFFICE

RICHARD M. GARRETT, OF YONKERS, NEW YORK

APPARATUS FOR DETECTING LEAKY CANS

Application filed June 7, 1928. Serial No. 283,610.

My invention has for its object an improved apparatus for detecting leaky cans, whether empty or filled, and separating them from the normal cans.

In apparatus for this purpose heretofore used, all the cans have been first immersed in compressed air and then relieved of the compressed air, with the result that leaky cans into which the compressed air has penetrated will have heads bulged outward at the center owing to the difference between the pressure of the contained air and the atmospheric pressure on the outside.

All the cans, normal and bulged, have been then fed to a revolving drum provided with mechanical detecting devices which would gauge and retain the bulged cans until they were released and discharged at a certain point, while the normal cans would not be so seized, and would be discharged at another point.

The mechanical detecting devices employed for retaining the bulged cans and separating them from the normal cans were not always accurate and efficient in operation.

The object of my invention is to provide a more accurate and efficient apparatus for detecting the bulged cans and separating them from the normal cans.

To this and other ends my invention comprises a can carrier, an electric detecting circuit, an electric motor in circuit, a can separating device controlled by the electric motor, a means for pushing each can axially on the carrier at a predetermined point in the movement of the carrier, electric and stop contacts positioned axially opposite said pushing means to meet the center and edge respectively of the opposite end of the pushed can when bulged, but only the edge of said can if not bulged, the contacts being in the detecting and separating circuit, so that bulged cans will operate the electric circuit and motor and the can separating device differently from the normal cans, and separate the leaky from the normal cans, substantially as hereinafter described and claimed.

To perform this process mechanically, I at present prefer to employ a revolving drum having peripheral open pockets into which the cans are fed from the compressed air apparatus, and equip each pocket with a can-pushing device and the contacts of the electric detecting circuit. I further provide a solenoid with armature as a motor in the circuit which when vitalized by a bulged can will by mechanical devices cause the bulged can to be locked and retained in its pocket until it reaches a certain point when it is released and falls from its pocket. The normal cans, which do not thus vitalize the circuit and solenoid, and are thus not retained in their open pockets fall therefrom at a point separate from the discharge point of the bulged cans, so that the normal and leaky cans are thus automatically detected and separated.

In order that my invention may be fully understood, I shall first describe in detail the mode in which I at present prefer to carry the invention into practice and then particularly point out the novel features of the invention in the claims.

Reference is to be had to the accompanying drawings forming part of this application in which like parts are designated by the same number in all the figures.

Figure 4:
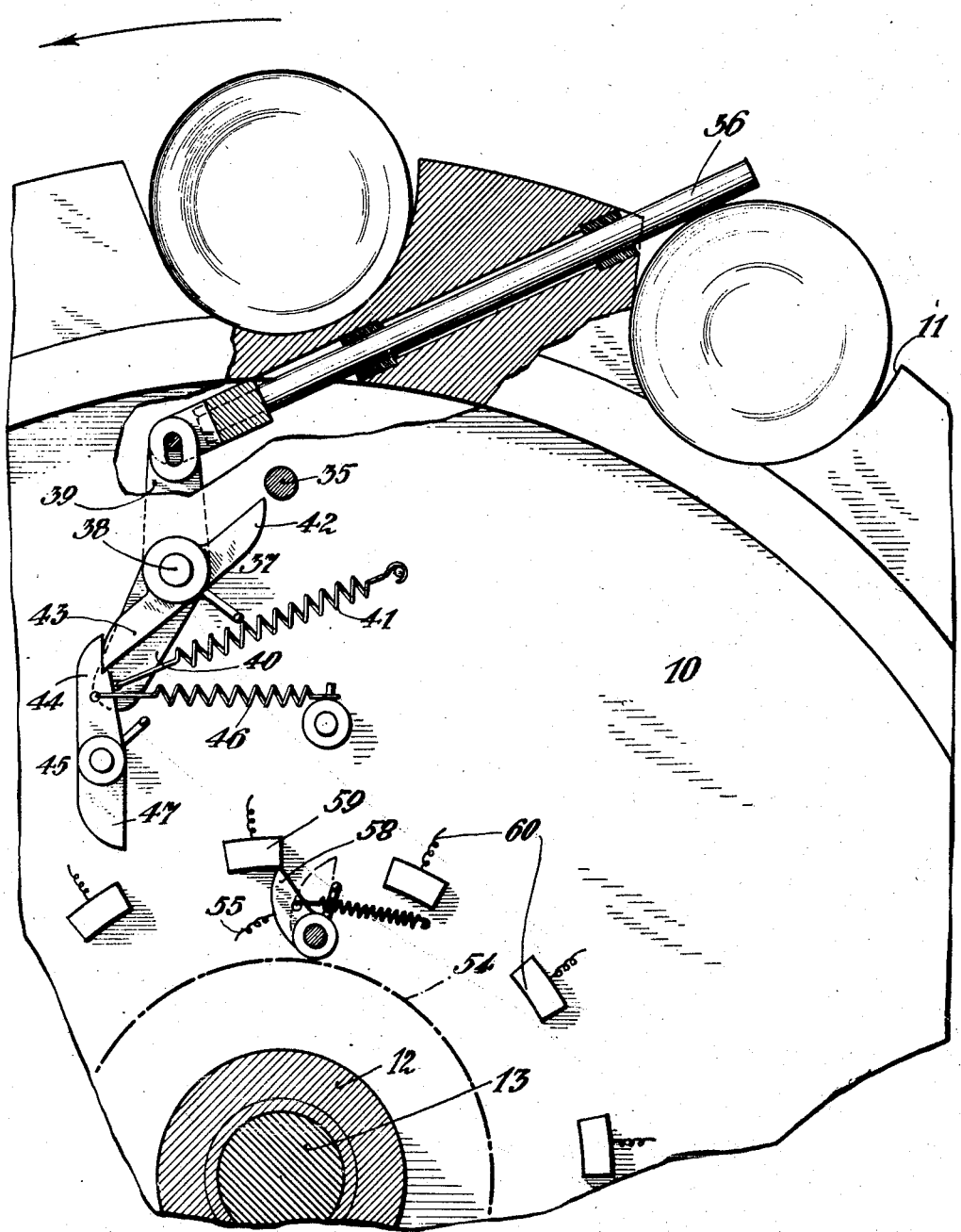
Figure 5:
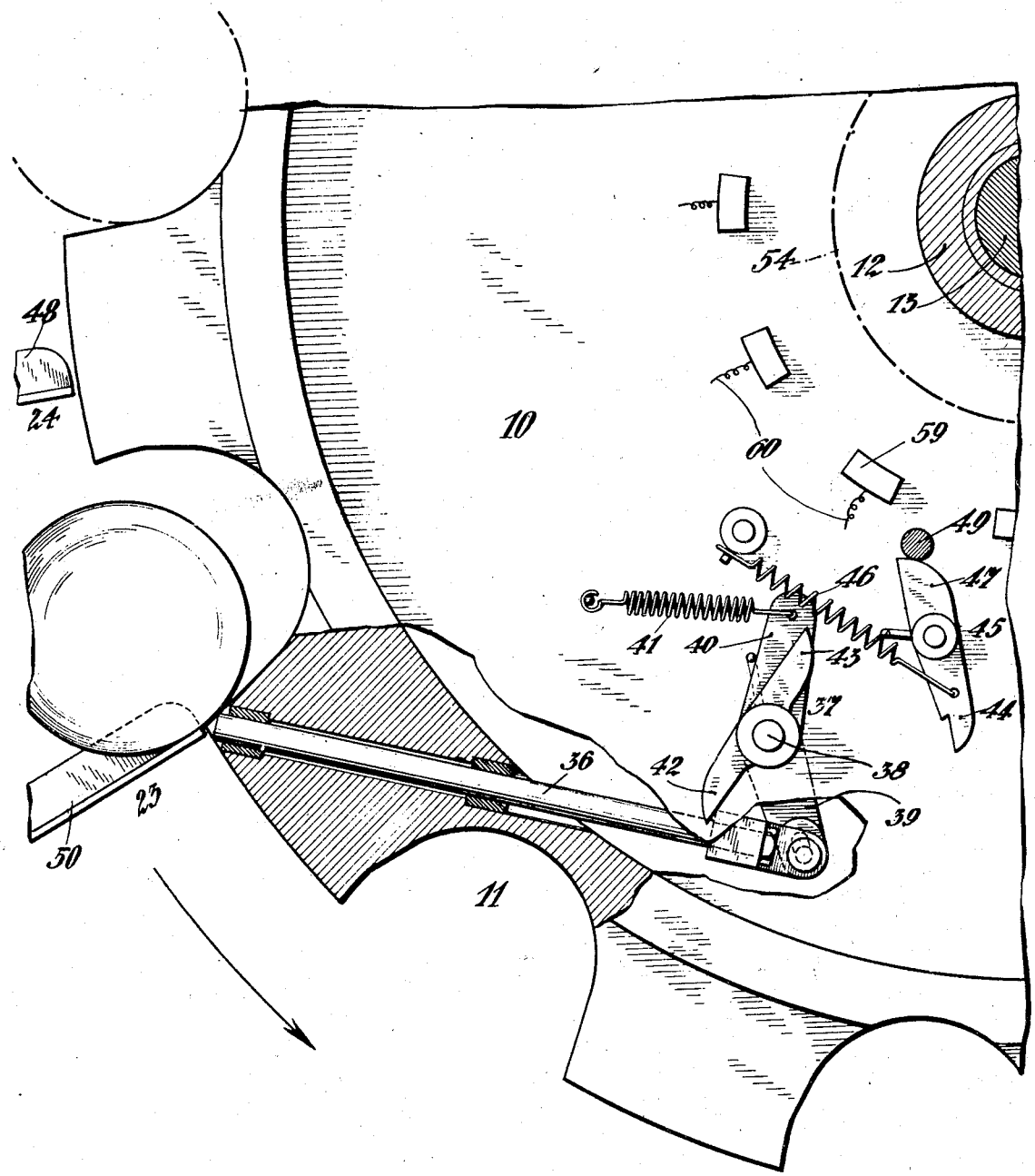
Figure 6:
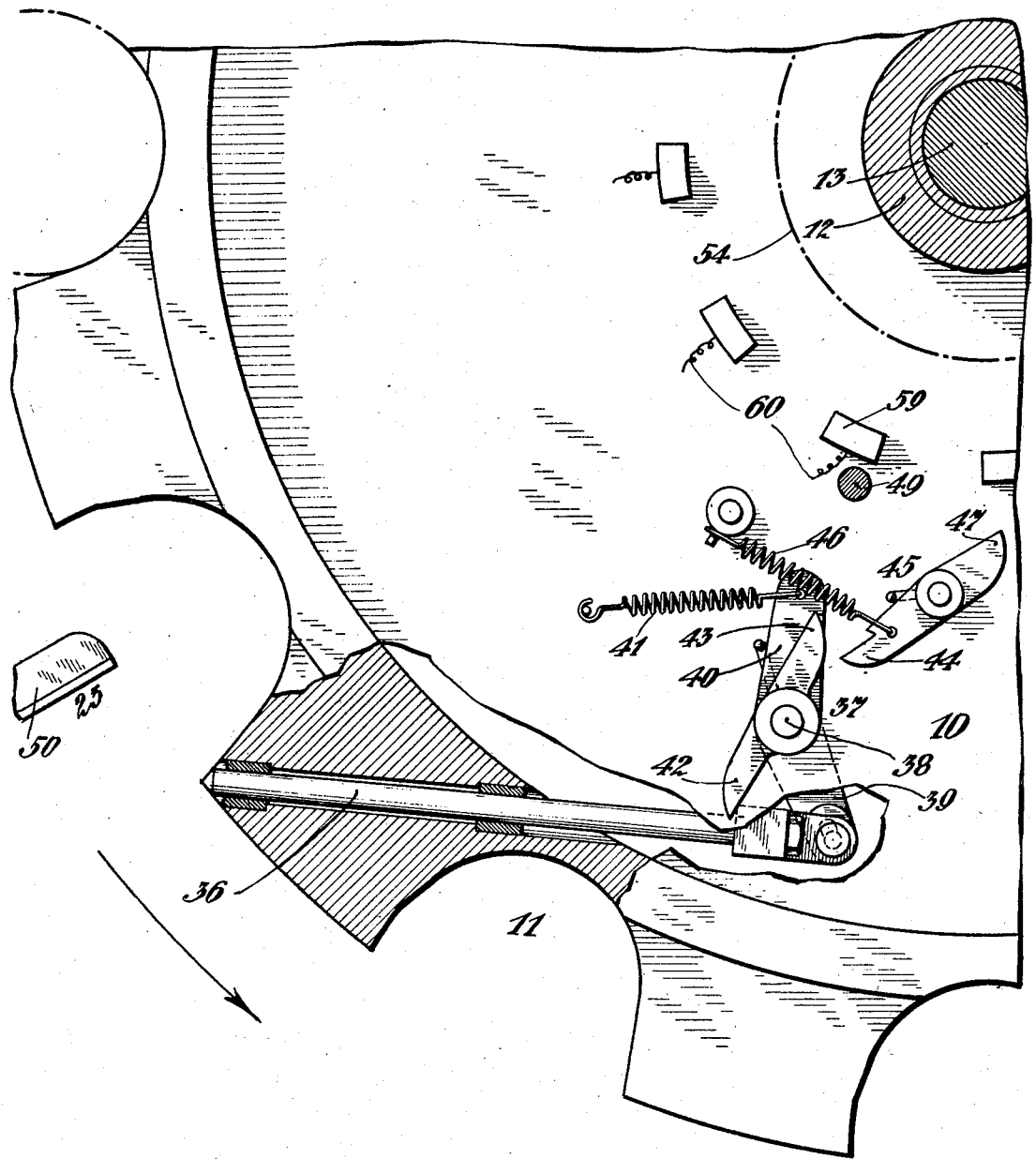

Figures 4, 5, and 6 are enlarged sectional side views showing in various positions the means for retaining and discharging the bulged leaky cans.

Figure 7:
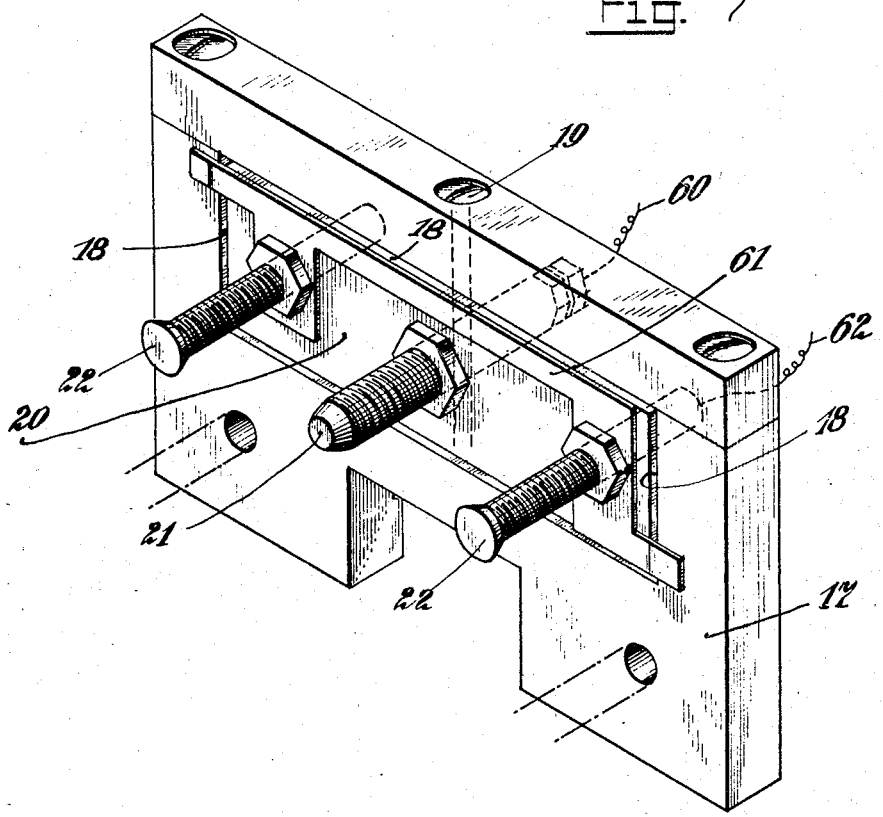

Figure 7 is an enlarged perspective view of the self-adjusting mounting of the electrical can-detecting contacts.

Figure 8:
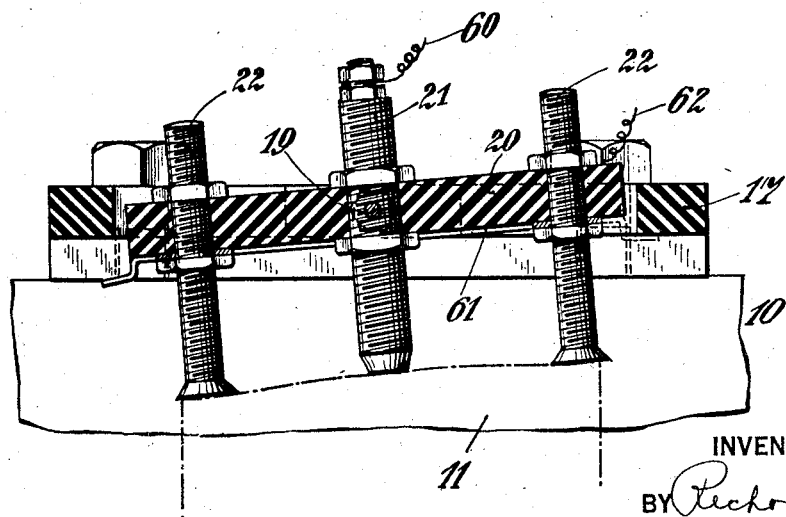

Figure 8 is a sectional plan view of the same.

Figure 9 is a diagrammatic view of the electric detecting and separating circuit.

In the drawings, I have illustrated the apparatus at present preferred by me for automatically separating the bulged leaky cans from the normal cans.

In the drawings 10 designates a cylindrical carrier drum mounted to revolve on its horizontal axis, and provided around its periphery with a succession of can-shape pockets 11, having their axes parallel to the axis of the drum, and opening radially outward.

Figure 1:
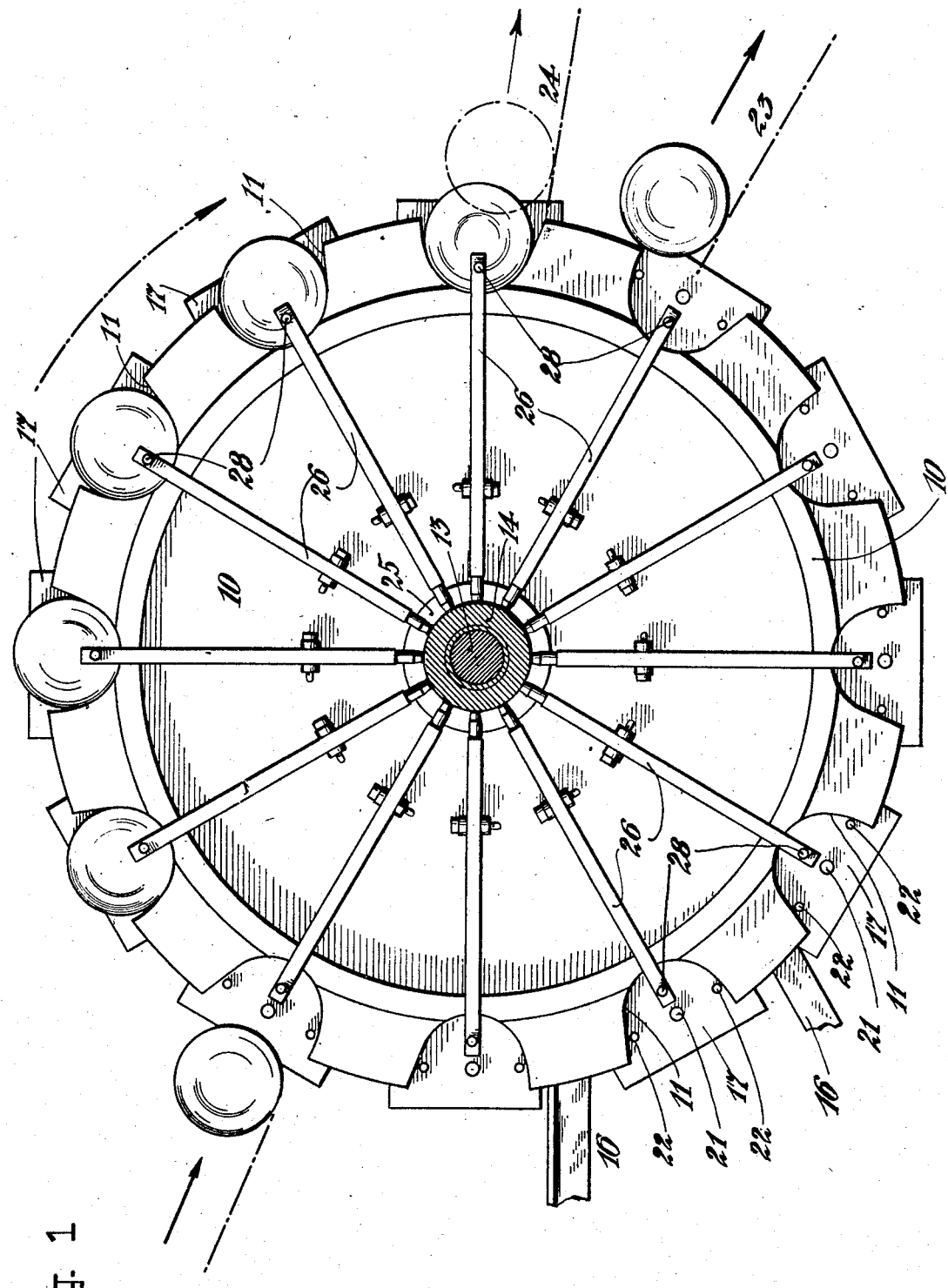
Figure 1 is a sectional side elevation of an apparatus for detecting and separating the leaky cans from the normal cans in accordance with my invention.

The normal and bulged cans are fed sidewise in succession as indicated in Figure 1 from the compressed air apparatus, which being in common use is not illustrated, into the successive pockets 11 of the drum 10 as the drum revolves, the axes of the cans thus lying parallel to the axis of the drum.

The hub 12 of the drum is fixed to a shaft 13, which is mounted to revolve in opposite end bearings 14, 15, fixed on the frame 16 of the apparatus and the drum and shaft 13 are revolved by any suitable power transmission.

On one end of each pocket 11 is fixed to the drum at right angles to the axis of the pocket an insulating bearing plate 17 (shown in detail in Figures 7 and 8), in a medial opening 18 of which is pivoted on a vertical pivot 19, an insulating plate 20. In the middle of the swinging plate 20 is fixed a horizontally adjustable electric contact 21 approximately in line with the axis of the can pocket and can contained therein.

In the swinging plate 20 on opposite sides of and equidistant from the contact 21, are also fixed horizontally adjustable stop contacts 22 in line respectively with the opposite edges of the can in the pocket, and electrically connected with each other.

The adjustment is such that when the can in each pocket is pushed, as by means hereinafter described, axially from the side opposite the contacts 21 and 22, the opposite edges of the can will both meet the respective contacts 22 on the swinging plate 20, however irregular may be the opposite edges of the can, and the center of the can head if bulged will touch the middle contact 21. If the head of the can, however, is not bulged but normal, its head will not touch the middle contact 21.

Each middle pocket contact and pair of stop contacts 22, are placed in the detecting and separating circuit, which is shown diagrammatically in Figure 9 and will be hereinafter described, so that when a bulged can touches the middle contact 21 as well as the edge stop contacts 22, the circuit will be closed, and, through a solenoid in circuit and mechanism operated thereby as hereinafter described, that particular can will be locked in the pocket until it reaches a certain point 23, Figure 1, in the revolution of the drum when it will be released and fall into a chute 50 (Figure 5).

The normal cans in the pockets which do not thus affect the circuit will not be locked in their pockets but will fall or roll by gravity out of the open pocket into a chute 48 (Figure 5) at a different point, indicated at 24, Figure 1.

Figure 2:
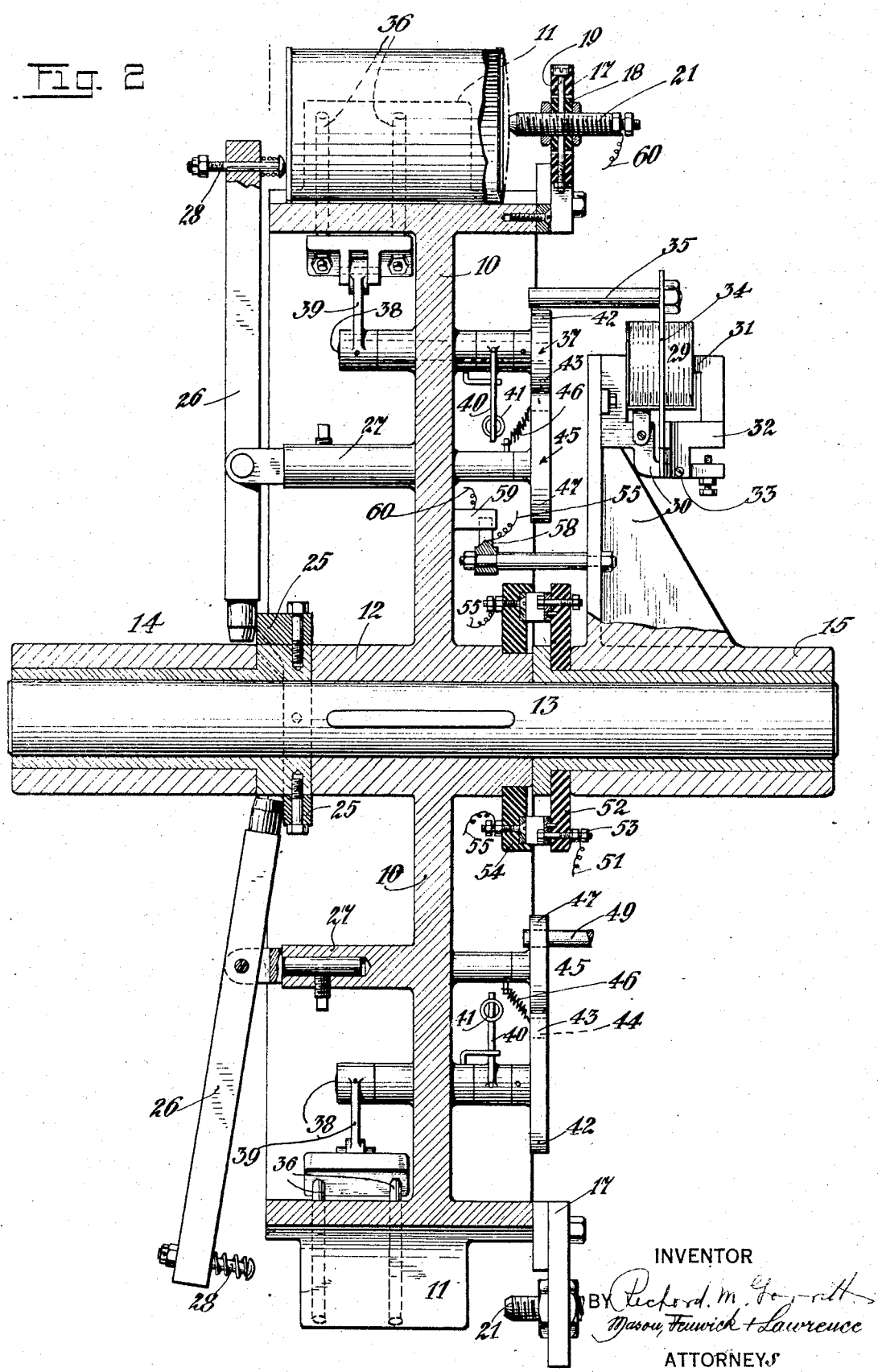
Figure 2 is a cross-sectional elevation of the same.

I prefer at present to cause each can to be pushed axially toward the contacts 21 and 22 before it reaches the top of the drum revolution, by means of a suitable cam 25 fixed on the shaft bearing 14, and a cam follower 26 for each pocket pivoted to a bearing post 27 on the drum, the outer end of each follower carrying a movable spring-cushioned can-presser 28, in line with the can, as best shown in Figures 1 and 2.

The separation-controlling solenoid 29 in circuit is here shown fixed on a standard 30 of the frame rising above the shaft bearing 15. The movable armature 31 of the solenoid is fixed on an arm 32 pivoted at 33 to the standard, and having an extension arm 34, bowed around the solenoid 29, and carrying a rod or setter 35 for the can-retaining mechanism. The arrangement is such that when the solenoid 29 is temporarily vitalized by a bulged can as above and hereafter described, the setter 35 will swing inward on its pivotal center 33 axially toward the drum into the path of the can locking or retaining device to be described of the particular pocket in which the leaky can is located.

The can retaining device for each pocket now preferred by me and shown in detail in Figures 4, 5, and 6 consists of a can locking bolt 36 mounted to slide axially and diagonally in the periphery of the drum carrier 10 across the open side of the pocket and across the outside of the can contained therein, and also a setting lever 37 to which the retaining bolt 36 is pivotally connected and which is itself pivoted to the drum on the center 38. The setting lever 37 for each pocket, in addition to the arm 39 which is pivotally connected to the retaining bolt 36, has an arm 40 connected to a spring 41, by which the retaining bolt 36 is normally withdrawn from the pocket as shown in Figures 5 and 6. The lever 37 has also a setting arm 42 arranged to revolve with the drum in the path of the setting rod 35 before referred to, when the setting rod 35 is projected by the vitalization of the solenoid 29.

The setting lever 37 is thus swung on its pivot against the spring 41 by the setting rod 35, and the can-retaining bolt 36 thus projected across the pocket and contained leaky can so as to lock the can in the pocket, until released and discharged as hereinafter described.

The setting lever 37 has another arm 43, which when the lever is rocked as described, is caught as shown in Figure 4 in the notch of the detent arm 44 of a trigger 45. The trigger 45 is pivoted to the drum and has a spring 46 to hold it in engagement with the lever arm 43 and also a releasing arm 47.

Figure 3:
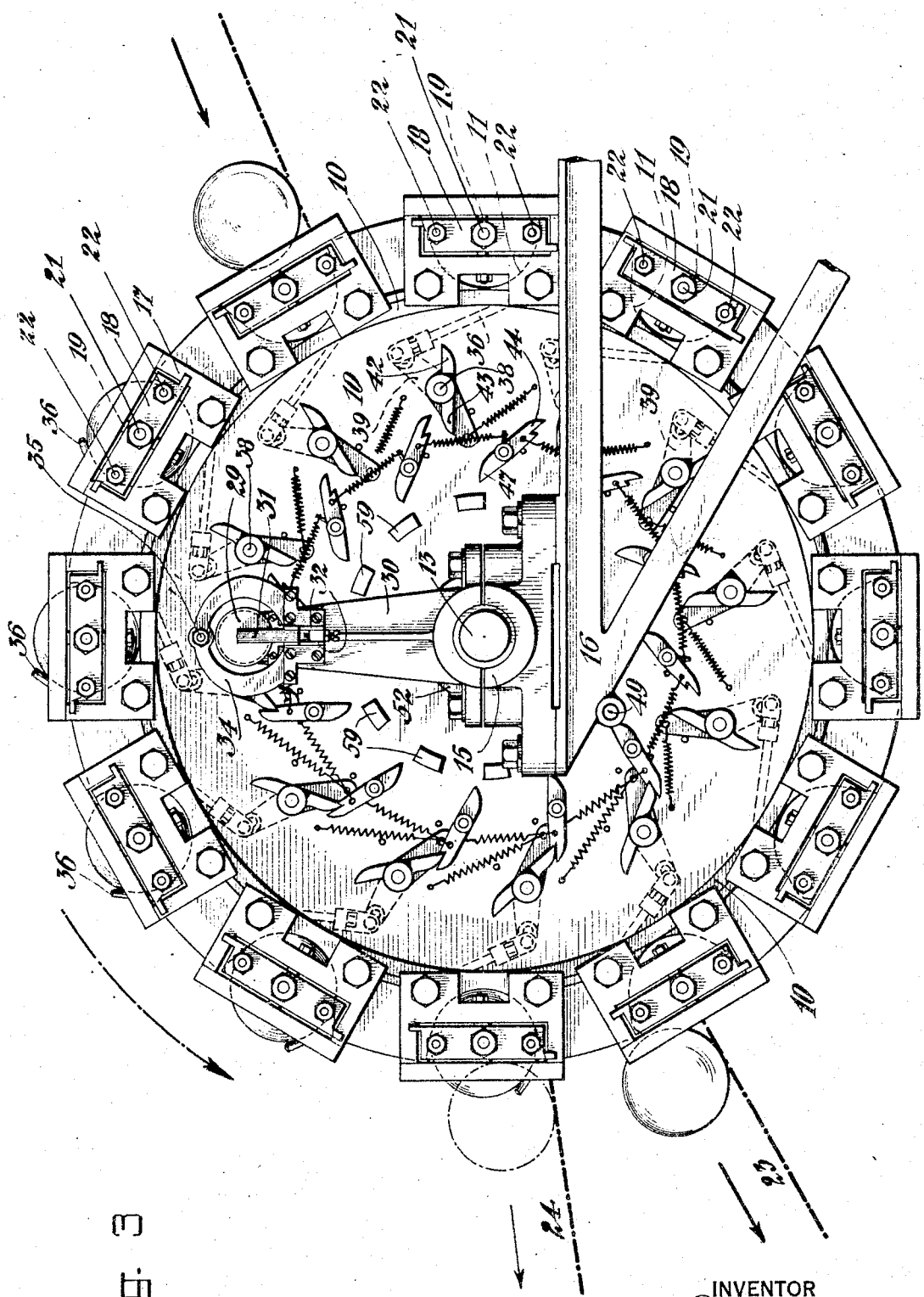
Figure 3 is a side elevation of the same from the side opposite to that of Figure 1.

As the drum revolves and the bulged can reaches the point 23, where it is to be discharged, the releasing arm 47 of the trigger 45, meets a tripper 49 fixed on the frame, as shown in Figures 3 and 5. The trigger 45 is thereby rocked against its engaging spring 46, the lever 37 released, and the spring-retracted can-retaining bolt 36 withdrawn from across the pocket and contained leaky can.

The bulged can being released then falls by gravity from its pocket into its discharge chute 50 at the point 23.

The leaky cans are thus automatically detected and separated from the normal cans with precision and expedition.

In order that the main circuit may be closed only as the cans in succession approach the upper detecting position, I prefer to arrange the circuit as shown (Figure 9), connecting parts being shown also in Figures 2 and 4.

The positive terminal of the current source is connected by a wire 51 to one terminal of the solenoid 29. The other terminal of the solenoid 29 is connected by the wire 55 to the yielding contact 58 which is arranged in the path of a circular series of contacts 59 fixed on the drum so as to be met by such contacts 59 in succession.

The contacts 59 are connected by wires 60 (Figure 9) to the respective can contacts 21. The other can contacts 22 are connected by wires 61 and 62 with a common wire 55' to the terminal of a contact plate 54 which is fixed on the hub 12 of the drum shaft 13, the revolving contact plate 54 revolving against a contact plate 52 which is fixed, as shown in Figure 2, on the shaft bearing 15. From the terminal 53 on the fixed contact plate 52 a wire leads to the negative pole of the source of current.

With this arrangement, as each pocket and can approaches the detecting position, the corresponding circuit through the can-contacts 21, 22, normally open, is temporarily closed by the meeting of the respective contact 59, with the pivotal contact 58. After the can-positioning and detecting operation described is completed, the respective revolving contact 59 passes the yielding contact 58, breaking that particular pocket circuit, and the detecting circuit of each succeeding pocket is temporarily closed and broken in the same manner.

It is evident that my detection process may be performed by other electric devices than that shown and described herein, and that the separating devices shown may be greatly varied without departing from the boundaries of my invention as defined by the following claims.

I claim as my invention:

1. Means for detecting and separating gas bulged cans from normal cans, comprising a can carrier to carry the cans transversely, means for pushing each can axially on the carrier at a predetermined point, contacts axially opposite the can pushing means positioned to meet the center and edge respectively of each bulged can but only the edge of normal cans when pushed, an electric circuit including the contacts, an electric motor in circuit, and a can separating device controlled by the electric motor.

2. Means for detecting and separating gas bulged cans from normal cans, comprising a revolving drum, transverse can pockets on the drum, means for pushing the cans axially in each pocket, contacts for each pocket opposite the can pushing means, positioned to meet the center and edge respectively of each bulged can but only the edge of normal cans when pushed, an electric circuit including the contacts, an electric motor in circuit, and means operated by the electric motor when vitalized whereby one set of cans is retained in its pockets and released therefrom at a point different from the other set of cans.

3. Means for detecting gas-bulged cans in accord with claim 2 in which the can pushing means comprises a cam, a cam-follower on the drum, and a can pusher for each pocket.

4. Means for detecting gas-bulged leaky cans in accord with claim 1, in which the contacts for the head edges of the can are fixed in a plate on opposite sides of the contact for the head center, and said plate is pivotally mounted to compensate for irregularity in the head of the can.

5. Means for detecting and separating gas-bulged leaky cans, in accord with claim 2 in which the can retaining and releasing means comprises a retaining bolt to be projected across each pocket outside the can therein, and means whereby the electric motor when vitalized by a can of one set causes the retaining bolt to be projected and retain said can until the can discharge point is reached when the can retaining bolt is retracted.

6. Means for detecting and separating gas-bulged leaky cans in accord with claim 2, in which the can retaining and releasing means comprises a can-retaining bolt for each pocket, a setter operated by the motor, when vitalized by a can of one set, to project the can-retaining bolt and retain the can, and a tripper to cause the can-retaining bolt to be retracted and release the can at a predetermined point.

7. Means for detecting and separating gas-bulged cans in accord with claim 2 in which the can-retaining and releasing means comprises a spring-retracted can retaining bolt for each pocket, a setter operated by the motor when vitalized by a can of one set to cause the can-retaining bolt to be projected, a trigger to hold the retaining bolt projected, and a tripper to release the trigger and permit the retaining bolt to be retracted by its spring at a predetermined point.

8. Means for detecting and separating gas-bulged leaky cans in accord with claim 2, in which the contacts of each can pocket are connected by a branch circuit to one of a circular series of branch contacts on the revolving drum, and a yielding contact in circuit is fixed in the path of the revolving series of branch contacts so as to close each branch circuit temporarily as the corresponding pocket and can approaches the bulge detecting position.

In testimony whereof I affix my signature.

RICHARD M. GARRETT.